United States Patent [19]

Richards

[11] Patent Number: 5,007,604
[45] Date of Patent: Apr. 16, 1991

[54] SIDE LOAD TYPE PIPE HANGER WITH SINGLE BOLT CLOSURE

[75] Inventor: Peter S. Richards, Issaquah, Wash.

[73] Assignee: Progressive Fastening, Inc., Seattle, Wash.

[21] Appl. No.: 269,969

[22] Filed: Nov. 9, 1988

Related U.S. Application Data

[63] Continuation of Ser. No. 730,285, May 3, 1985, abandoned.

[51] Int. Cl.$^5$ .............................................. F16L 3/08
[52] U.S. Cl. ..................................... 248/62; 248/74.1
[58] Field of Search ................. 248/62, 59, 58, 63, 248/74.1, 74.4

[56] References Cited

U.S. PATENT DOCUMENTS

| | | | |
|---|---|---|---|
| 2,616,645 | 11/1952 | Kindorf et al. | 248/62 |
| 2,846,169 | 8/1958 | Sullivan | 248/62 |
| 2,944,778 | 7/1960 | Katis | 248/62 |
| 3,167,286 | 1/1965 | Sherburne | 248/62 |
| 3,265,340 | 8/1966 | Attwood | 248/62 |
| 3,517,901 | 6/1970 | Jenkins | 248/59 |
| 4,019,706 | 4/1977 | Weiland, Sr. | 248/62 |

Primary Examiner—Alvin C. Chin-Shue
Attorney, Agent, or Firm—Delbert J. Barnard

[57] ABSTRACT

A bolt (92) is inserted threaded end (98) first upwardly through a first opening (88) within a lower arm portion (80) of a C-shaped saddle (74), then through a larger opening (90) in the upper arm portion (82) of the saddle (74). The opening (90) is hexagonal in shape. A nut (100) is then installed on the bolt (92). The nut (100) has a small end portion (102) which is hexagonal in shape. The nut (100) is hand tightened and then is aligned with the opening (90) so that the small end portion (102) will drop into the opening (90). A wrench is then used on the head (96) of the bolt (92) for rotating the bolt (92) for the purpose of drawing the nut (100) and bolt (92) together and applying a clamping force on a pipe (110) which is in the saddle (74).

11 Claims, 3 Drawing Sheets

SIDE LOAD TYPE PIPE HANGER WITH SINGLE BOLT CLOSURE

This application is a continuation of Ser. No. 730,285, filed May 3, 1985, now abandoned.

DESCRIPTION

1. Technical Field

This invention relates to pipe hangers and more particularly, to an improved way of closing the pipe engaging saddle portion of a side-load type pipe hanger.

2. Background Art

The present invention relates to an improvement of the general type of pipe hanger disclosed by U.S. Pat. No. 3,517,901, granted June 30, 1970, to John C. Jenkins, known as a side-load type hanger. An excepted advantage of this type of hanger is that it comprises a single fastener requiring the use of a single tool for its installation.

As an inspection of U.S. Pat. No. 3,517,901 will show, the side-load type hanger is characterized by a generally C-shaped saddle portion in which a pipe section is received. The saddle is welded to one end of a support leg. The support leg is at its other end connected to a support structure. The pipe section, surrounded by a liner, is positioned within the interior of the saddle. In accordance with the teachings of U.S. Pat. No. 3,517,901, a key is inserted through aligned slot type openings in arm portions of the saddle. The key has a head at its lower end which abuts against the lower arm portion of the saddle. When the key is in place, an installation tool is used to curl the opposite end portion of the key over the end of the upper arm portion of the saddle.

The use of a key closure for the saddle has produced several problems. Firstly, when the end of the key is bent over the end of the upper arm of the saddle, the weld connection between the saddle and the support leg is stressed and often tore. It is difficult to regulate the clamping force on the pipe, so quite often the clamping force is not tight enough. It is difficult to correct this situation by again grasping the end of the key and curling it an additional amount for tightening the grip on the pipe. Another known form of pipe hanger comprises two pipe engaging members. The central portion of one of the members is secured to an end of the support leg to form a "T". This member is configured to fit down on top of a section of pipe. The second member extends below the section of pipe. A bolt is provided on each side of the pipe. The bolts extend through end portions of the clamp members and thread into nuts. The bolts are screwed into the nuts for the purpose of securing the two clamp members together and for regulating the clamping force on the pipe.

The above two bolt type system was in use long before the system disclosed by U.S. Pat. No. 3,517,901. The system disclosed by U.S. Pat. No. 3,517,901 was considered to be an economic improvement over the two bolt system because it required installation of but a single closure member and a single tool. The "T" support required the use of two bolts. Another objection to the nut and bolt system is that there was sometimes improper alignment between the holes in the two members and this created an assembly problem.

A primary object of the present invention is to provide a side-load type pipe hanger which includes a nut and bolt assembly for closing the open side of the saddle, and which involved an arrangement which allows the bolt to be quickly installed and quickly secured in place by use of a single wrench.

Other pipe hanger systems known in the patent literature are disclosed by the following U.S. Pat. Nos. 1,579,418, granted Apr. 6, 1926, to C. C. Tomkinson; 1,619,768, granted Mar. 1, 1927, to Friedrich W. Schubert; 1,850,275, granted Mar. 22, 1932, to Lothar R. Zifferer; 2,762,592, granted Sept. 11, 1956, to Charles Adams, Jr.; 2,762,598, granted Sept. 11, 1956, to Richard M. Runge; 2,936,991, granted May 17, 1960, to George J. Picha et al; 3,034,753, granted May 15, 1962, to Frank C. Johnston et al; 3,273,838, granted Sept. 20, 1966, to Walter H. Fletcher et al; 3,506,227, granted Apr. 14, 1970, to John C. Jenkins; 4,305,557, granted Dec. 15, 1981, to Joseph W. Kowalski; 4,461,440, granted July 24, 1984, to Richard W. Heath and Holland No. 13267, published in 1925. These patents should be carefully considered for the purpose of putting the present invention into proper perspective relative to the prior art.

DISCLOSURE OF THE INVENTION

An embodiment of the pipe hanger constructed according to the present invention comprises a generally C-shaped saddle comprising a pair of spaced apart arm portions and an interconnecting bight portion, and a support leg member connected to the saddle. In accordance with the present invention, it also includes an improved system for securing a pipe section within the C-shaped saddle.

The system of the invention for securing a pipe section in place is basically characterized by a bolt having a rod body, an enlarged head at a first end of the rod body and a threaded end portion at the second end of the rod body. It also comprises a nut which includes a central opening that includes threads which complement the threads of the bolt. The nut has a small size first end portion which has a cross-sectional shape that is other than circular, a large size second end portion, and a shoulder where the two ends meet. One of the arm portions of the saddle includes a first opening which is smaller in size than the head of the bolt but is larger in size than the rod body of the bolt. In other words, the rod body of the bolt makes a loose fit in the first opening. The second arm portion includes a second opening which is substantially larger in size than the rod body of the bolt. This allows the rod body to also fit loosely in the second opening. The second opening is smaller in size than the second end portion of the nut but is sized and complementarily shaped to snugly receive the small size first end portion of the nut.

Owing to this arrangement, a pipe section can be placed into the C-shaped saddle. Then, a workman can quickly insert the bolt into place. The threaded end portion is moved easily and quickly through the first opening, because of the loose fit. It is then also moved easily and quickly through the second opening, also because of its loose fit in the second opening. Then the nut is brought to the bolt, with its small size first end portion directed towards the second opening. The nut is partially screwed onto the bolt by hand. Then, the bolt and nut are moved endwise to place the small size first end portion of a nut snugly within the second opening. The noncircular cross section of the small end of the nut and the second opening prevents relative rotation of the nut in the second opening. Thus, the boundaries of the second opening in effect function as a wrench for holding the nut against rotation. Then, a single wrench is placed on the head of the bolt and is rotated for the purpose of drawing the nut and bolt together, for applying a clamping force on the pipe section. This force can easily be adjusted by regulating the amount that the bolt is tightened. Later adjustments can be easily made. The nut and bolt can be easily disassembled if desired and can then be reassembled and tightened again to provide the desired amount of clamping force on the pipe section.

In preferred form, the saddle is connected to the lower end of the support leg, with the general orientation being like the support leg to saddle arrangement disclosed by the aforementioned U.S. Pat. No. 3,517,901. The first opening is provided in the lower arm portion of the saddle and the second opening is provided in the upper arm portion of the saddle. Thus, the bolt is inserted into place from below, and it is never necessary to use a wrench in the region above the upper arm portion of the saddle. In many installations the room in this region is very limited and the use of a wrench in this region could be very difficult or even impossible.

In this preferred arrangement, the threaded end of the bolt is moved upwardly through an oversized opening, so that the bolt can be moved through the opening quite quickly. The oversized nature of this opening makes it quite easy to move the bolt through the first opening. The second opening is even larger in size because it is sized to receive the external dimensions of the small end of the nut. Thus, precise alignment is not necessary. Next the nut is installed and started by hand. It is then quite easy to allow the nut and bolt assembly to drop, for the purpose of bringing the small end of the nut into the second hole. When the nut is so positioned it cannot rotate. The opening functions like a box wrench and holds the nut against turning. The bolt head can then be easily and quickly rotated for drawing the nut and bolt together. When the bolt head reaches the lower arm portion of the saddle, a wrench can be used to further turn the bolt head, for tightening the bolt until the desired clamping pressure on the pipe section is obtained. The bolt is self-aligning. If the two openings are in substantial alignment, when the bolt is tightened its rod body will end up substantially centered relative to the first opening However, another advantage of this system is that exact alignment of the two openings is not necessary.

A further advantage of the nut and bolt type fastener of the present invention, and its arrangement with the saddle, is that the relatively tight engagement of the nut within the opening in the upper arm portion of the saddle causes the nut and bolt assembly to in a sense brace the upper arm portion against appreciable bending as the bolt and nut are being screwed together The oversize nature of the opening in the lower arm portion allows movement to occur at this end, between the bolt and the lower arm portion of the saddle. As a result, greater bending will occur in the lower arm portion of the saddle and the weld connection between the upper arm portion and the leg member will be protected from forces which would tend to tear the weld.

Another advantage of the system of the present invention is that the hanger can be made stronger and tougher than the type of hanger disclosed by U.S. Pat. No. 3,517,901, without any substantial sacrifice in economic advantage. It is an object of the present invention to develop a side-load type pipe hanger which exhibits working load capabilities more nearly equaling that of a standard "T" strap, bottom-load, pipe hanger.

It is a further object of the invention to develop a side-load type pipe hanger that features a reliable and reusable method of restraining the pipe within the hanger body, effectively replacing the sheet metal key in the system shown by U.S. Pat. No. 3,517,901.

It is a further object of the present invention to accomplish both of the above, while maintaining the relatively low cost of the side-load design, and the simplicity of the "single tool" installation feature.

The hanger system of the present invention, when compared with the hanger system disclosed by U.S. Pat. No. 3,517,901, possesses these advantages:

The hanger of the present invention can be made to be tougher and stronger because the sheet metal key has been replaced by a nut and bolt assembly. Thicker metal can be used for the saddle for the reason that the projecting end of the upper arm portion does not have to bend (in fact it is restrained against bending) to function. The hanger of the present invention is simpler to install because the self-aligning, captured nut arrangement used in the top arm portion of the pipe saddle allows the pipe fitter to install the pipe using just one, very common tool—a single wrench. The "prevailing-torque" locking feature of the captured nut allows the fitter to install and remove the bolt up to seven times before the nut should be replaced. The clamping force of the nut and bolt assembly is less likely to tear the weld connection between the pipe saddle and the support leg. The fit of the nut in the hole in the support arm, and the contact of the nut shoulder around the hole, stiffen the support arm against bending and in this manner protect the weld.

In accordance with another aspect of the invention, the support leg is constructed from flat strap metal and at one end it is welded to an arm portion of the saddle. In the case of a pipe hanger for a relatively large diameter pipe, the general plane of the flat strap metal can be oriented to extend lengthwise of the arm portion of the saddle, and it can be maintained for width at its end to be welded to the arm portion of the saddle. This is because the relatively large diameter nature of the pipe will make it possible to make the arm portion long enough that the portion of it which extends from the edge of the strap material will be large enough to accommodate the nut retaining opening and there will be sufficient room for the larger end of the nut.

In accordance with the invention, in an installation involving a smaller diameter piece of pipe, the strap material can be rotated 90° so that the general plane of the flat strap metal will extend transversely of the arm portion of the saddle. Another advantage of this arrangement is that the weld is less likely to tear in response to a clamping force applied by the nut and bolt assembly and/or a combat shock force. The free end of the arm portion can flex easier and further without applying a tearing force on the weld. According to yet another aspect of the invention, the end portion of the support leg that is directly connected to the pipe receiving saddle extends transversely of the upper arm portion of the saddle, and then such support leg is twisted at a location between its ends so that the opposite end of the support leg is perpendicular to the first end of the support leg.

A uniform diameter tubular member can be used as the support leg for a pipe hanger used for hanging a relatively large diameter pipe. The tubular member is inherently stiff and a strong weld joint can be provided between it and the saddle. For smaller size pipes, the end portion of the tubular support leg that is connected to the saddle can be swaged for the purpose of reducing its diameter. For use with smaller pipe yet, the swaged end portion of the tubular leg member could be flattened for the purpose of elongating it in a direction extending transversely of the upper arm portion of the saddle. This swaging and/or flattening would be done for the purpose of providing additional room for accommodating a side portion of the nut.

These and other features, advantages and characteristics of the invention will be apparent from the various embodiments of the invention which are illustrated and described below in connection with the drawing.

BRIEF DESCRIPTION OF THE DRAWING

Like reference numerals are used to designate like parts throughout the several views of the drawing, and:

FIG. 6 is a view like FIG. 4, but on a substantially larger scale, showing the nut installed and showing how the lower arm of the saddle is influenced to bend, and the upper arm portion of the saddle is restrained against bending, by the nut and bolt assembly and its relationship to the two holes in the two arm portions of the saddle;

FIG. 11 is a view of a prior art nut shown inserted in a hole in a piece of sheet metal; and FIG. 13 is a view like FIG. 12, but showing the leading portion of the nut curled back onto the sheet metal, which is the normal installation mode.

BEST MODE FOR CARRYING OUT THE INVENTION

Figures 1, 2A, 2B, 3, 4, 5:
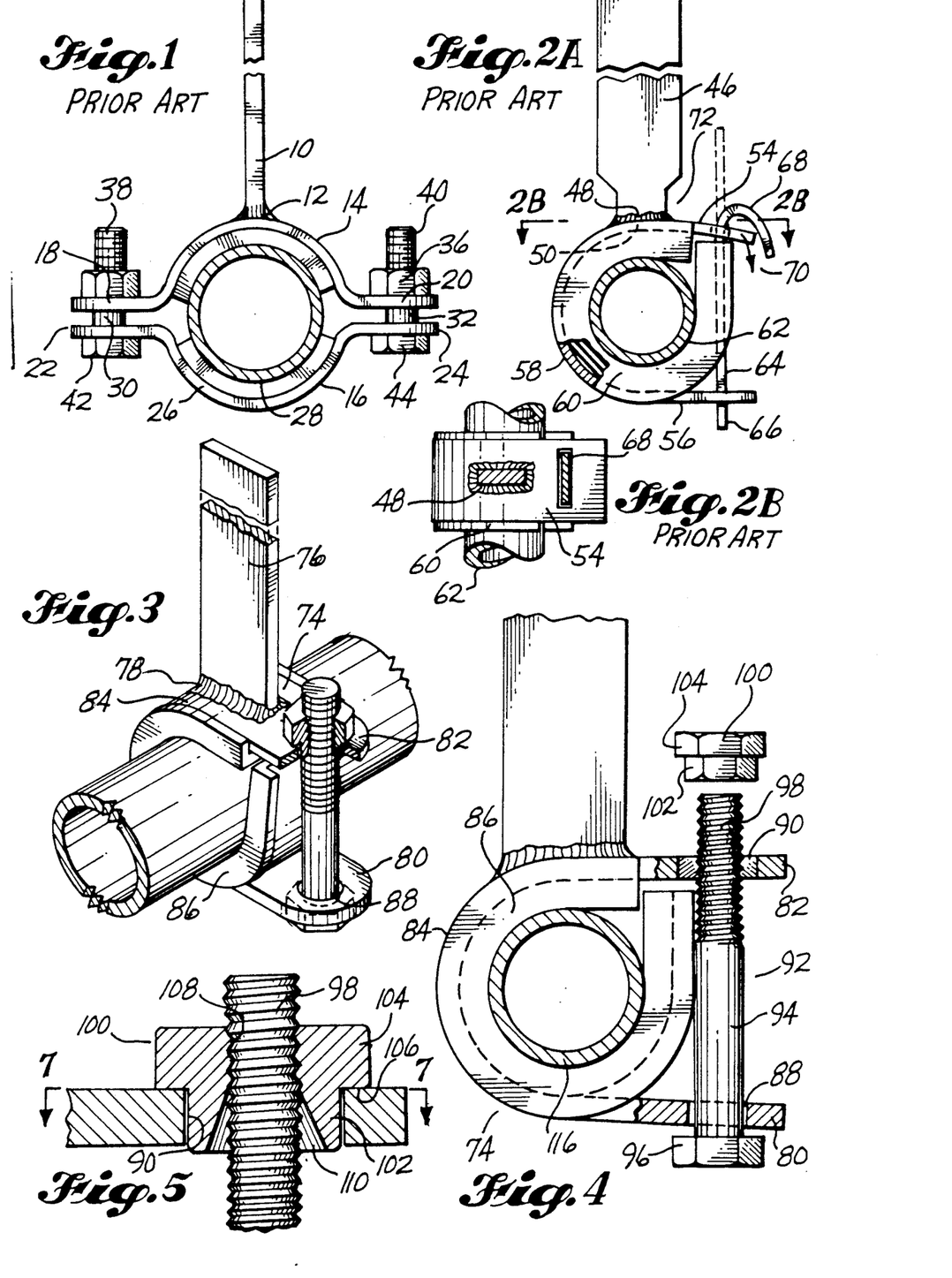
FIG. 1 is a fragmentary front elevational view of a standard "T" strap, bottom-load, pipe hanger.
FIG. 2A is a fragmentary elevational view of a side-load type pipe hanger, showing in phantom line the leading end portion of the key prior to it being bent and in solid lines showing the key after it has been bent over.
FIG. 2B is a sectional view taken substantially along line 2B—2B of FIG. 2A.
FIG. 3 is a fragmentary pictorial view of an embodiment of the invention.
FIG. 4 is an enlarged scale, fragmentary elevational view of the embodiment shown by FIG. 3, showing the nut in spaced alignment with the threaded portion of the bolt, prior to installation of the nut on the bolt.
FIG. 5 is a sectional view through an installed nut and the immediate region surrounding it, on yet a larger scale.

FIG. 1 is an elevational view of a standard "T" strap, bottom-load, pipe hanger. It comprises a support leg 10, welded at 12 to a midportion of an upper clamp strap 14. A lower clamp strap 16 is provided which is of the same configuration, but this member is separable from the rest of the assembly. The midportions of the clamp straps 14, 16 are curved. Each includes a pair of ears 18, 20 and 22, 24, respectively. A resilient pad or liner 26 is provided within the curved portions of the straps 14, 16. As shown, in use, the liners 26 are in contact with the pipe 28. A first bolt 30 extends through aligned openings in the ears 22, 18 and a second bolt 32 extends through aligned openings in the ears 24, 20. A nut 34, 36 is threaded onto threaded end portions 38, 40. The nut and bolt assemblies 30, 34 and 32, 36 are screwed together for drawing the two straps 14, 16 together and into clamping engagement with the pipe 28. The shank portions of the bolts 30, 32 are smaller in diameter than the openings in the ears 18, 22 and 20, 24, so that there is a relatively loose fit of the bolts 30, 32 within the holes. The bolt heads 42, 44 are most generally always located at the bottom of the assembly. The surface of the bolt heads 42, 44 which contact the surfaces of the ears 22, 24 are flat and the nuts 34, 36 are ordinary nuts. They present a generally flat surface to the ears 18, 20.

The hanger shown by FIG. 1 is recognized as being strong and the pressure of the straps 14, 16 on the pipe 28 can be easily adjusted by regulating the tightening of the nut and bolt assemblies 30, 34 and 32, 36. A disadvantage of this type of hanger is its cost. It involves more. parts. Also, it involves more labor to use. Even though the openings in the ears 18, 22, 20, 24 are slightly oversized, at times an alignment problem is experienced as the assembly comprises two pairs of openings and two bolt fasteners 30, 32.

Referring to FIG. 2, the hanger shown by this figure is the hanger disclosed in the aforementioned U.S. Pat. No. 3,517,901. It comprises a flat strap support leg 46 welded at 48 to an upper portion 50 of a generally C-shaped saddle 52. Saddle 52 comprises an upper support arm 54, a lower support arm 56 and an interconnecting bight portion 58. Upper portion 50 of saddle 52 is situated where upper arm portion 52 joins with the bight portion 48.

A one piece liner 60 is provided within the saddle 52, to extend about the pipe section 62. A key 64, having a lower end head 66, is inserted upwardly through a first slot opening in the lower arm portion 56, then through a second slot opening in the upper arm portion 54. Then, a special bending tool is inserted on the leading end portion 68 of the key 64, and is used for bending such end portion 68 over the outer end of upper arm portion 54, as illustrated. The force applied on the end portion 68 of key 64, for rolling it over, applies a bending force on arm portion 54, indicated by the arrow 70.

A disadvantage of the pipe hanger disclosed by FIG. 2 is that it is difficult to properly set the clamping force on the pipe 62. Once the end portion 68 of key 64 has been rolled over, it is difficult to change the force which it applies, tending to draw the two arm portions 54, 56 together. Also, the force applied directly on arm portion 54 tends to stress the weld at 72, and may cause a tear to start in the weld if care is not taken during installation of the key 64.

The leg notch above the weld 72 makes the connection of the leg 46 to the saddle 52 very weak, but this notch is necessary to the type of hanger shown by FIGS. 2A and 2B.

Referring to FIG. 3, the embodiment of the invention that is shown comprises a saddle 74 which in basic configuration may be like saddle 52 of the prior art hanger shown by FIG. 2. It may be supported by the support leg 76 which is welded at its lower end, at region 78, to an upper portion of the saddle 74. Saddle 74 includes a first or lower arm portion 80, a second or upper arm portion 82, and an interconnecting bight portion 84. A liner 86 may be used which is like the liner 60 shown by FIG. 2.

In accordance with the present invention, a first opening 88 is provided in the lower arm portion 80. A second and larger opening 90 is provided in the upper arm portion 82. The centers of openings 88, 90 are in substantial alignment.

A bolt 92 is inserted through the openings 88. Bolt 92 includes a rod body 94, an enlarged head 96 at one end, and a threaded portion 98 at its opposite end. The bolt 92 is adapted to mate with a nut 100.

As shown by FIG. 5, nut 100 comprises a first small end portion 102, a second large end portion 104, and a shoulder 106 defined where the two end portions 102, 104 meet. Nut 100 includes a threaded central opening 108 having complementary threads to the threads on threaded portion 98 of bolt 92. Nut 100 may also include a non-threaded conical entry 110.

As shown by FIGS. 3-7, the large end portion 104 of nut 100 is hexagonal and the small end portion 102 is also hexagonal. Regarding the small end portion 102, it is only functionally important that this portion be non-circular in cross section.

The particular nut 100 that is illustrated is a known article of commerce. However, the manner in which it is used in the present invention is not known.

Figures 6, 12, 13:
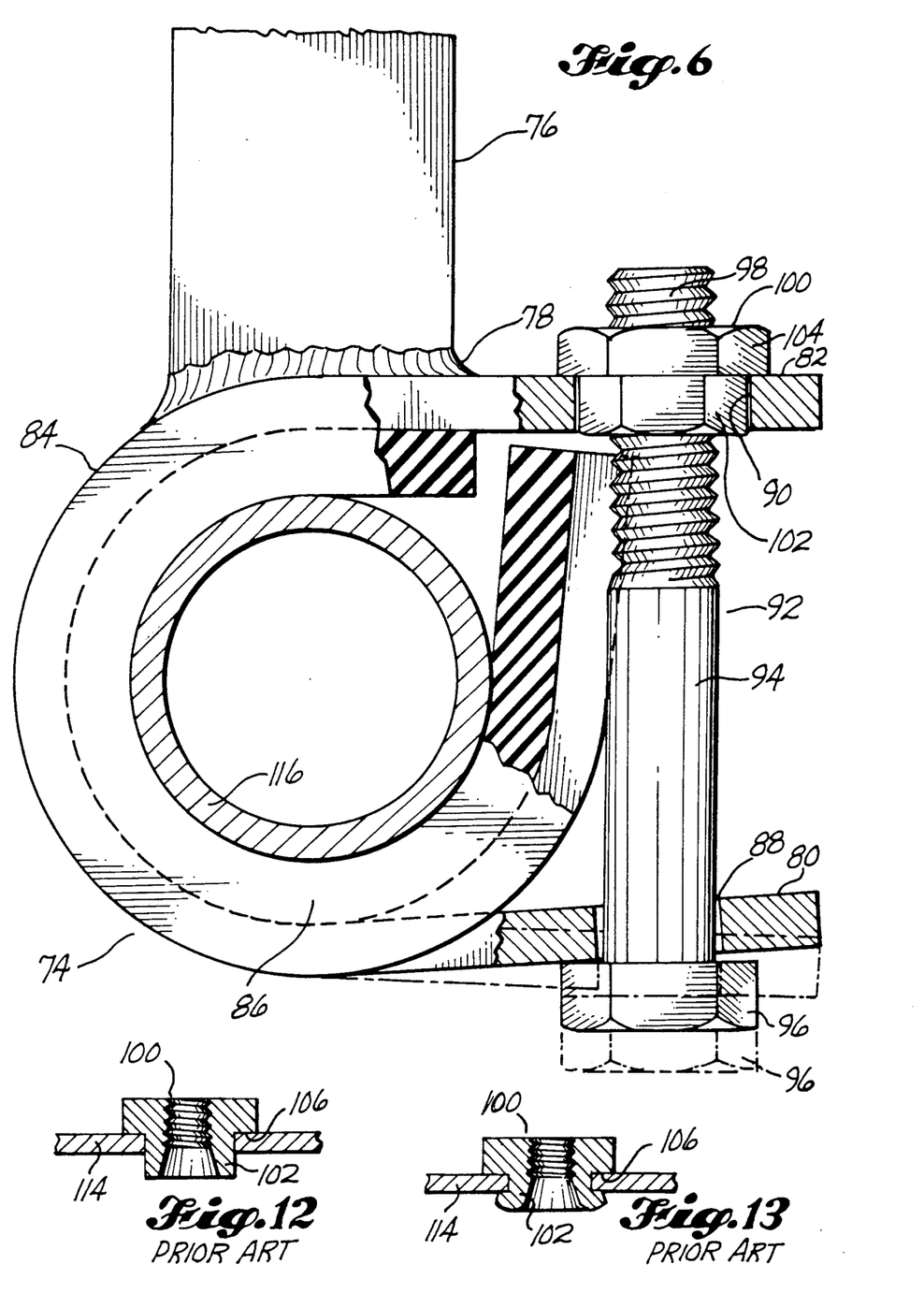
Figure 7:
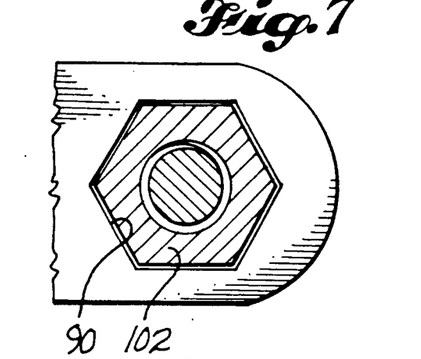
FIG. 7 is a sectional view taken substantially along line 7—7 of FIG. 5.

FIGS. 12 and 13 illustrate the known use of the nut construction that is illustrated. The nut in these figures is also designated 100.

A hexagonal opening 112 is formed in a piece of sheet metal 14. Opening 112 is sized to snugly receive the small end 102 of the nut 100. The shoulder 106 rests against the sheet metal 114 where it immediately surrounds the opening 112. As shown by FIG. 12, the end portion 102 is sized to extend through and beyond the opening 112. Then, it is "rolled" back against the sheet metal, as shown by 114, for the purpose to in this manner secure the nut 100 to the sheet metal 114.

Returning to the description of the present invention, in accordance with the present invention the small end portion 102 of nut 100 is sized to be snugly received within the opening 90 (FIG. 7), but there is no projecting portion which is turned over permanently securing the nut 100 in place. Rather, the opening 90 functions as a "box" wrench for holding the end portion 102, and hence nut 100, against turning when the end portion 102 is within the opening 90.

As is clearly shown by FIG. 4, the lower opening 88 is oversized relative to the rod body 94 of bolt 92. Thus, the bolt 92 can be inserted upwardly through opening 88 rather quickly and easily. The opening 90 is substantially larger than the upper end portion 98 of bolt 92, so it is quite easy to locate end portion 98 relative to opening 90 so that the bolt 92 can be quickly inserted through opening 90.

In accordance with an aspect of the present invention, a pipe section 116 is surrounded by a liner 86 and is moved laterally into the open throat of the saddle 74. Then the bolt 92 is moved upwardly through the openings 88, 90, in the manner described. Next, the nut 100 is brought into engagement with the threaded portion 98 of bolt 92, with the small diameter end portion 102 directed downwardly. The conical region 110 that was formed for the purpose of adapting the end portion 102 for rolling over the sheet metal edge (FIGS. 12 and 13) now serves to guide the threaded end portion of the bolt 92 into the threaded region 108 of nut 100. The nut 100 is screwed onto the threads 98, by hand, until the nut and bolt assembly 92, 100 are joined. Then, the assembly is allowed to drop downwardly, to place the end portion 102 of nut 100 into the opening 90. Opening 90 now functions as a box wrench, enabling a single wrench to be used on the bolt head 96, for rotating the bolt 92 in an amount sufficient to apply the necessary squeezing or clamping force on the pipe 116.

Referring to FIG. 6, when the nut end portion 102 is within opening 90, and the bolt 92 is tightened, something else happens. The side surfaces of nut portion 102 are moved into contact with the side surfaces of the opening 90. As the bolt head 96 and the nut 100 are drawn together, the shoulder 106 is drawn into tight engagement with the metal surrounding opening 90.

The tight fit of nut end portion 102 within the opening 90, and the pressure exerted by the shoulder 106 against the region of upper arm portion 82 which surrounds the opening 90, serves to stiffen the part of arm portion 82 which extends outwardly from the support leg 76, so that it does not want to bend. This is in contrast to the prior art hanger shown by FIG. 2 in which the end portion 68 of key 64 is rolled over the end of the upper arm portion, causing it to want to bend away from support leg 46.

Referring back to FIG. 6, the rod body 94 of bolt 92 still makes a relatively loose fit within the opening 80. As a result, the nut and bolt assembly are automatically moved by the turning force on bolt 92 into a position in which the axis of the bolt 92 extends substantially perpendicular to the surface of arm portion 82 against which shoulder 106 bears. The inner surface of bolt head 96 exerts a force on the lower arm portion 80. The lower arm portion 80 has a relatively long unsupported portion and as a result it can bend much more freely than the upper arm portion 82. Thus, the clamping pressure is applied to the pipe 116 by the lower arm portion 80 bending upwardly towards the upper arm portion 82. The loose fit of bolt body 94 in the opening 88 allows relative movement to occur between the bolt 92 and the lower arm portion 80, so that bending is not apt to occur between the rod body 94 and the surfaces of opening 88, in a manner tending to resist upward deflection of arm portion 80.

The fact that there is no key which has to be rolled over the outer end of arm portion 88 makes it possible to round off the outer end portion of arm 82, eliminating sharp corners. The outer end of the lower arm portion 80 is also rounded. The fact that the engagement of the nut portion 102 within the opening 90, and the pressure of the shoulder 106 against the arm portion 82, resists bending of arm portion 82, results in protection for the weld 78. It is not likely to tear as it would be if the outstanding part of arm portion 82 were to be bent downwardly.

The fact that arm portion 82 does not have to bend downwardly makes it possible to extend the full width of the support leg 76 down to the upper arm portion 82. This results in greater weld area at 76 and a stronger connection.

FIGS. 3-7 relate to an embodiment in which the pipe diameter 116 is large enough so that the part of arm 82 which projects outwardly from support leg 76 is large enough to accommodate the opening 90 and provide side room above arm portion 82 sufficient to accommodate nut portion 104.

Figure 8:
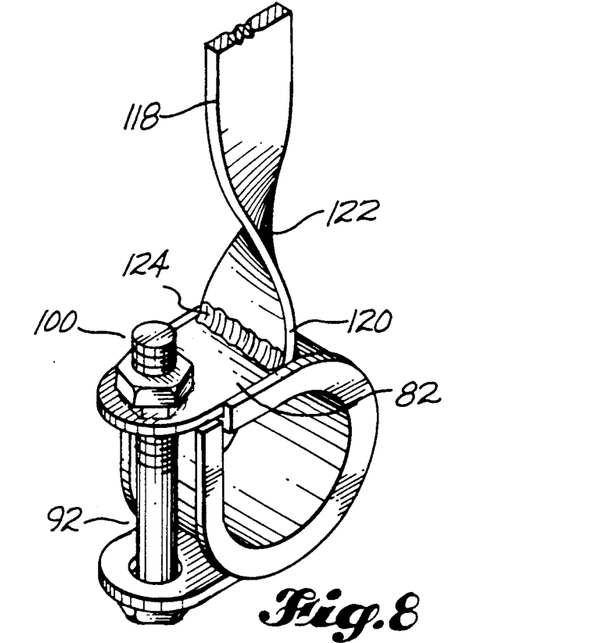
FIG. 8 a view like FIG. 3, but of a modified form of support leg.

FIG. 8 relates to a modified arrangement of the support leg which might be used for a smaller diameter pipe. In this embodiment, the support leg 118 has a lower end portion 120 which is arranged to have its general plane extend laterally across the upper arm portion 82. Then the support leg 118 is twisted at 122, so that the portion of support leg 118 which is above the twist 122 has a general plane which extends perpendicular to the general plane of lower end portion 120. The orientation of the lower end portion 120 provides an orientation of the weld 124 which would be less likely to tear, in the event of an over tightening of the nut and bolt assembly 92, 100, and also would make it possible to place the opening 90 and the nut 100 closer to the support leg 118 than would be the case with a support leg oriented as shown by FIGS. 3, 4 and 6.

Figure 9:
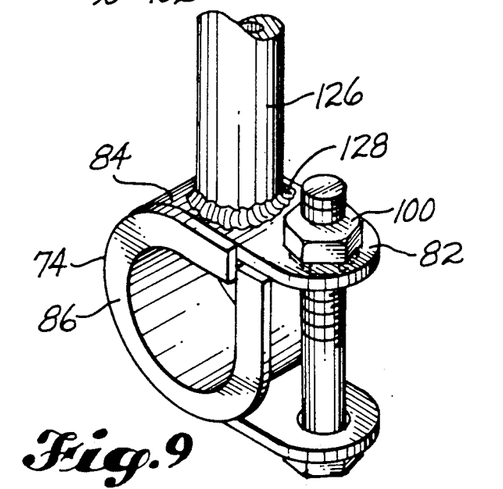
FIg. 9 is a view like FIGS. 3 and 8, but of a second modified of support leg.

The embodiment shown by FIG. 9 is also constructed for use with a relatively large diameter pipe. In this embodiment the support leg 126 is a uniform diameter length of pipe or tubing. At its lower end it is welded to the saddle, at 128. The lower end of support leg 126 intersects a portion of the saddle which includes some curvature. The circular form of the support leg 26 results in a substantial weld area and the curvature resulting in added strength to the connection 128.

Figure 10:
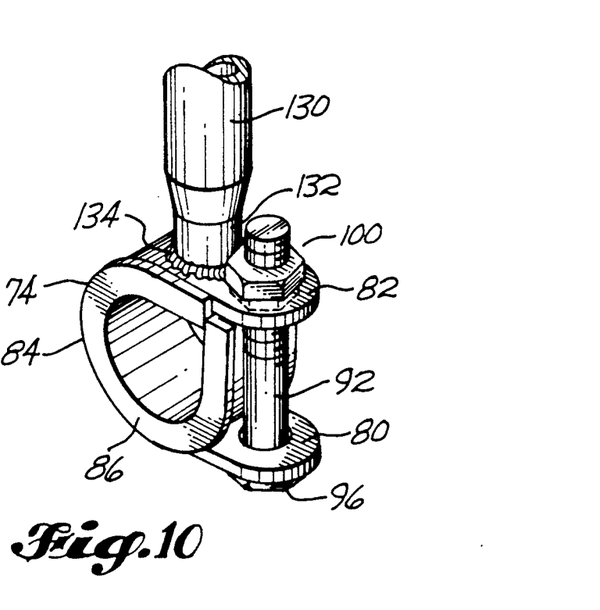
FIG. 10 is a view like FIGS. 3, 8 and 9 but of a third modified form of the support leg.

FIG. 10 shows a support leg 130 having a lower end portion 132 which is reduced in size by swaging. The reduced end 132 is welded at 134 to the saddle 74. This type of an arrangement is usable with a hanger that is constructed to hold a smaller diameter pipe than the hanger shown by FIG. 9. The swaging of the end portion 132 provides side room for the nut 100, on the support leg (130) side of opening 90. The center of the support leg is kept directly over the center of the pipe being supported. These hangers are subjected to very severe shock loads—and centered support is critical to the survival of the piping system—i.e. each hanger is a "link".

Figure 11:
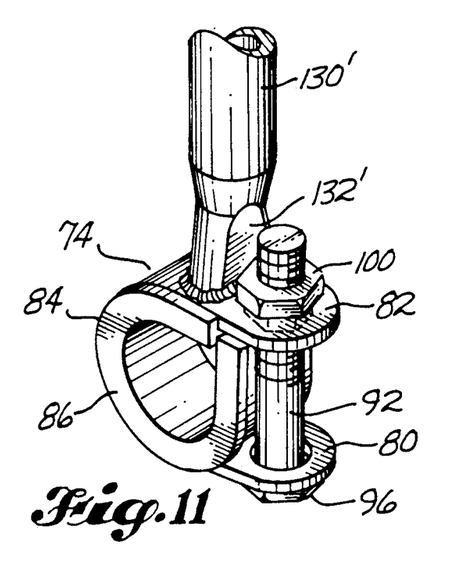
FIG. 11 is a view like FIGS. 2 and 8-10, but of yet another modified form of the support leg.

If additional side room is needed, the swaged end portion could also be flattened at its sides, as shown in FIG. 11. In this figure the swaged and flattened end portion is designated 132'.

FIGS. 8-11 show saddles 74 which are essentially equal in size. However, these figures illustrate the modifications in, the support leg construction that would allow the hanger assembly to be used with smaller size pipe. Comparing FIG. 8 with FIG. 3, if the hanger of FIG. 8 were to be used with smaller size pipe, the nut and bolt assembly 92, 100 would be moved over closer to the support leg 118. The twist 122 would make it possible to position the nut 100 closely adjacent a side surface of the lower end portion 120 of support leg 18.

Comparing FIG. 10 with FIG. 9, if the hanger of FIG. 10 were to be used with a smaller pipe, the nut and bolt assembly 92, 100 would be moved over closer to the support leg 130. The swaged nature of end portion 132 would allow the nut 100 to be placed relatively close to the support leg 130.

Comparing FIG. 11 with FIG. 10, if the hanger shown by FIG. 11 were to be used with a pipe that was still smaller in diameter, the swaged end portion would be formed to an oval configuration. This would allow placement of the nut 100 closer yet to the center axis of the support leg 130'.

Other modifications in the construction of the hanger could be made without departing from the spirit of the invention as defined by the following claims which are to be interpreted in accordance with the established rules of claim interpretation, including use of the doctrine of equivalents.

What is claimed is:
1. A pipe hanger, comprising:
a piper receiving saddle constructed from a flat metal bar formed into a generally C-shape and comprising a first straight arm portion having an inner end, a second straight arm portion having an inner end, and an interconnecting, substantially semi-circular bight portion connected directly to the inner ends of said arm portions, said first and second arm portions each extending at a tangent from the bight portion and each having a free outer end, said outer ends defining between them a pipe avenue for accommodating a pipe which is moved sideways through said avenue into the saddle;
a support leg having an end that is butt welded to an external surface of said saddle; and
an improved system for securing a pipe within the C-shaped saddle, comprising:
a bolt comprising a rod body, an enlarged head at the first end of said rod body and a threaded end portion at the second end of said rod body;
a nut including a central opening that is threaded with threads which complement the threads on the bolt, said nut including a small size first end portion having a cross-sectional shape that is other than circular, and a large size second end portion;
a first opening in said first arm portion which is smaller in size than the head of the bolt but is larger in size than the rod body of the bolt;
a second opening in said second arm portion, said second opening being substantially larger in size than the rod body of the bolt, so that the rod body also fits loosely in said second opening, and smaller in size than the second end portion of the nut, and being sized and complementary shaped to snugly receive the small size first end portion of the nut, and hold said first end portion of the nut, and the nut itself, against turning;
whereby a pipe section can be moved sideways through said avenue between the free ends of the first and second arm portions, into said C-shaped saddle, and the bolt can be inserted threaded end portion first through the first opening, and then through the second opening, and then the nut can be applied to the bolt with its small size first end portion directed towards the second opening, and the bolt can be screwed into the nut and the nut can be moved endwise to place the small size first end portion of the nut snugly within the second opening, and the head of the bolt can be rotated for drawing the nut and bolt together and applying a clamping force on the pipe section, with the fit of the small size first end portion of the nut within the second opening serving to hold the nut against rotation while the bolt is being rotated, and with the snug engagement of the small end of the nut within the second opening, backed by the large end of the nut, resulting in the nut and bolt substantially stiffening the second arm portion as the nut and bolt assembly are drawn together, so that bending will occur within the first arm portion;
with the first opening being sized to allow sideways alignment movement of the bolt in the first opening as said first arm portion bends and the bolt becomes aligned with the nut, during tightening of the bolt within the nut; and with the first straight arm portion bending towards the second straight arm portion when the nut and bolt assembly are drawn together.

2. A pipe hanger according to claim 1, wherein the support leg member is welded to the second arm portion, and the nut when engaged by the second opening is positioned on the same side of the C-shaped saddle as the support leg member, and wherein the snug engagement of the small end of the nut within the second opening, backed by the large end of the nut, results in the nut and bolt assembly substantially stiffening the second arm portion as the nut and bolt assembly are drawn together, causing at least most bending to occur within the first arm portion.

3. A pipe hanger according to claim 2, wherein the support leg member is a tubular member having an end abutting said second arm portion, said tubular member being welded to said second arm portion by a circular weld which encircles said end.

4. A pipe hanger according to claim 1, wherein the small size first end portion of the nut has a hexagonal cross sectional shape and the second opening has a complementary hexagonal shape.

5. A pipe hanger according to claim 1, wherein the support leg member is an elongated member having first and second ends, and wherein the first end of said support leg member is welded to an arm portion of the C-shaped saddle at a location offset from the opening in such arm portion, said attached arm portion extending substantially perpendicular from said support leg member out to its free end.

6. A pipe hanger according to claim 5, wherein the support leg member is welded to the second arm portion, and the nut which is engaged by the second opening is positioned on the same side of the C-shaped saddle as the support leg member.

7. A pipe hanger according to claim 1, wherein the support leg member is a tubular member.

8. A pipe hanger according to claim 7, wherein the support leg member is an elongated member having first and second ends, and wherein a first end of said member is welded to an arm portion of the C-shaped saddle at a location offset from the opening in such arm portion and said attached arm portion extends substantially perpendicular from the support leg member out to its free end.

9. A pipe hanger according to claim 8, wherein the support leg member is welded to the second arm portion, so that the nut will be positioned on the same side of the C-shaped saddle as the support leg member.

10. A pipe hanger according to claim 9, wherein the first end portion of said support leg member is reduced in size in comparison with the the support leg member above it, for the purpose of providing space between the support leg and the second opening, and wherein a portion of the nut is received within said space.

11. A pipe hanger according to claim 10, wherein the first end portion of the support leg member is both reduced in size and is flattened on its sides in a direction extending laterally of the second arm portion, such flattening being done to provide additional space for a portion of the nut, and wherein a portion of said nut is within said additional space.

* * * * *

UNITED STATES PATENT AND TRADEMARK OFFICE
CERTIFICATE OF CORRECTION

PATENT NO. : 5,007,604

DATED : April 16, 1991

INVENTOR(S) : Peter S. Richards

It is certified that error appears in the above-identified patent and that said Letters Patent is hereby corrected as shown below:

```
Col. 1, line 44, "Another" begins a new paragraph.
Col. 1, line 68, "involved" should be -- involves --.
Col. 3, line 46, there is a period after "opening";
     and in line 55, there is a period after "together".
Col. 4, line 58, "According" begins a new paragraph.
Col. 5, line 29, "invention." should be -- invention; --.
Col. 5, line 46, after "Fig. 8", insert -- is --.
Col. 5, line 48, "FIg." should be -- FIG. --.
Col. 5, line 52, "Figs. 2" should be -- Figs. 3 --.
Col. 5, line 54, "Fig. 11" should be -- Fig. 12 --.
Col. 6, line 24, delete the period after "more".
Col. 9, lines 22, 23, "result- ®in" should be -- results in --.
Col. 9, line 43, delete the comma after "in".
Claim 1, col. 10, line 3, "piper" should be -- pipe --.
Claim 1, col. 10, line 52, "and the head" should be
     -- and then the head --.
```

Signed and Sealed this

Tenth Day of November, 1992

Attest:

DOUGLAS B. COMER

Attesting Officer

Acting Commissioner of Patents and Trademarks